United States Patent [19]

Hood

[11] 4,188,823

[45] Feb. 19, 1980

[54] DETECTION OF THE TRANSITIONAL LAYER BETWEEN LAMINAR AND TURBULENT FLOW AREAS ON A WING SURFACE

[75] Inventor: William R. Hood, Hampton, Va.

[73] Assignee: The United States of America as represented by the Administrator of the National Aeronautics and Space Administration, Washington, D.C.

[21] Appl. No.: 964,009

[22] Filed: Nov. 27, 1978

[51] Int. Cl.² .............................................. G01M 9/00
[52] U.S. Cl. ..................................... 73/147; 73/205 L
[58] Field of Search ...................... 73/147, 205 L, 180

[56] References Cited

U.S. PATENT DOCUMENTS

| | | | |
|---|---|---|---|
| 2,519,015 | 8/1950 | Bensen | 73/180 |
| 2,523,481 | 9/1950 | Rabenhorst | 73/147 |
| 2,761,315 | 9/1956 | Anderson Jr. et al. | 73/180 |
| 2,871,698 | 2/1959 | Bagby | 73/147 |
| 2,957,345 | 10/1960 | Cheney | 73/147 |

FOREIGN PATENT DOCUMENTS 200838  10/1967  U.S.S.R. ..................................... 73/147

*Primary Examiner*—Donald O. Woodiel
*Attorney, Agent, or Firm*—William H. King; John R. Manning; Howard J. Osborn

[57] ABSTRACT

A system is disclosed for detecting the laminar to turbulent boundary layer transition on a surface while simultaneously taking pressure measurements. The system uses an accelerometer for producing electrical signals proportional to the noise levels along the surface and a transducer for producing electrical signals proportional to pressure along the surface. The signals generated by the accelerometer and transducer are sent to a data reduction system for interpretation and storage.

7 Claims, 1 Drawing Figure

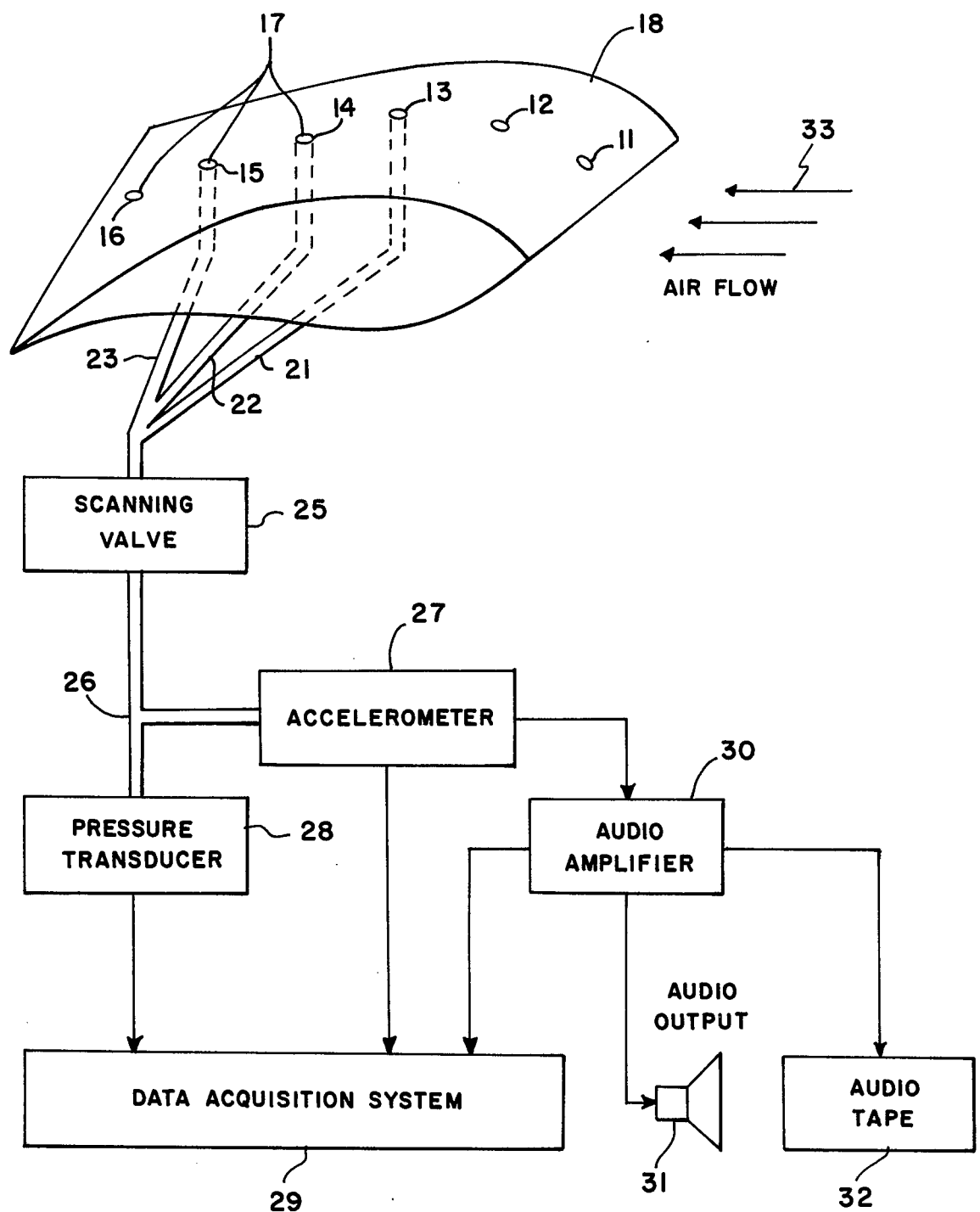

4,188,823

DETECTION OF THE TRANSITIONAL LAYER BETWEEN LAMINAR AND TURBULENT FLOW AREAS ON A WING SURFACE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The lift and drag properties of a wing are determined in wind tunnel tests. This is done by measuring the pressure upon the wing surface at various points along the wing. In order to alter the wing shape to improve the lift thereof it is helpful to know the location of the transition between the laminar and turbulent flow areas of the wing. This is so because in general laminar flow over the wing results in lift whereas turbulent flow results in drag. Thus, it is desirable to encourage laminar flow and discourage turbulent flow over most of the wing surface.

A method of measuring the pressure on the wing involves placing orifices at various points on the wing from the leading to the trailing edges. Pressure transducers are connected to the orifices via pneumatic tubes. The present method of detecting the transition between the laminar and turbulent flow areas requires an individual to enter the tunnel and listen to the noise at each of the orifices using a stethoscope. Since the noise level of laminar flow regions is relatively low compared to that of turbulent flow regions the transition between the two areas can be found rather accurately. However, there are several limitations imposed by this method. Firstly, an operator must be physically in the tunnel to connect his stethoscope to the orifices along the wing surface. Therefore, measurements cannot be made if the environment in the tunnel is hostile (e.g., the pressure is above or below atmospheric pressure) or if the space within the tunnel is limited. Secondly, the pressure measurements cannot be taken while the operator is listening to the noise since the stethoscope (essentially an open tube) introduces a leak into the system. Thirdly, the noise levels cannot be recorded and correlated.

It is therefore an object of the present invention to provide a system for detecting the transition between laminar and turbulent flow areas on a test surface that does not require an operator to enter the wind tunnel.

Another object of the present invention is to provide a system for detecting the transition between laminar and turbulent flow areas on a test surface that provides an electrical output to permit data input to a multitude of systems, such as a computer for data reduction and storage.

An additional object of the present invention is to provide a system for detecting the transition between laminar and turbulent flow areas on a test surface that allows pressure measurements to be taken simultaneously with noise level measurements.

The foregoing and other objects of the invention and many of the advantages attendant therewith will become apparent when the claims and description contained herein are considered in conjunction with the accompanying drawings.

SUMMARY OF THE INVENTION

The present invention is an improved method of determining the transitional layer between laminar and turbulent flow areas on a wing surface. The invention essentially consists of replacing the stethoscope of the previous method with an accelerometer that is connected to the orifices placed upon the wing. The accelerometer produces an electrical signal that is proportional to the noise level at the selected orifice in the wing surface. A scanivalve is used to selectively connect the accelerometer to a plurality of orifices creating a number of signals that can be recorded and graphed to yield a picture of the noise levels along the wing. From this picture the transition layers can be found easily.

BRIEF DESCRIPTION OF THE DRAWING

The sole FIGURE is a schematic view depicting the components of the system and their relationship to each other.

DETAILED DESCRIPTION OF THE INVENTION

The invention can be understood best by referring to the accompanying drawing. As shown in the FIGURE, orifices 11 through 16 (many more are usually used), generally referred to as orifices 17, have been supplied to a wing surface 18. Pneumatic tubes 19 through 24, (tubes 19, 20 and 24 are not shown) extend from the inside of orifices 17 to a scanning valve 25. A pneumatic tube 26 extends from scanning valve 25 to an accelerometer 27 and a pressure transducer 28. Accelerometer 27 and pressure transducer 28 produce electrical signals proportional to the noise level and pressure, respectively, at the orifices 17. Any suitable data acquisition system 29 is connected to both pressure transducer 28 and accelerometer 27 to record the signals therefrom. Accelerometer 27 is also connected via an audio amplifier 30 to an audio output 31 to an audio tape 32 and to data acquisition system 29.

Airflow designated by arrows 33 is passed over wing surface 18. Scanning valve 25 is adjusted so that a pneumatic tube extending from orifice 11 is connected via a pneumatic tube to accelerometer 27 and to pressure transducer 28. As air passes over orifice 11 the pressure and noise level thereat are thereby measured by pressure transducer 28 and accelerometer 27. Data acquisition system 29 records the measurements. The noise may also be heard via audio output 31 and recorded by audio tape 32. Scanning valve 25 is then adjusted such that the pneumatic tube extending from orifice 12 is connected via a pneumatic tube to pressure transducer 28 and to accelerometer 27. The pressure and noise measurements are thusly taken for orifice 12. In the same manner scanning valve 25 subsequently connects each of the remaining orifices one at a time to the measuring and recording apparatus. The laminar to turbulent boundary can be determined easily by visual inspection of the resulting graph.

It is seen, therefore, that this invention aids greatly in the determination of the laminar to turbulent boundary on a wind tunnel test model. Additionally, the invention allows both pressure and boundary layer measurements to be taken simultaneously.

It is to be understood that the specific description of the invention contained herein is illustrative only and that the actual invention is not so limited. Modifications and variations of the invention will be apparent to one skilled in the art. Such changes which are apparent to those skilled in the art in light of the above teachings do not depart from the spirit and scope of the appended claims and are intended to be included therein.

What is new and desired to be secured by Letters Patent of the United States is:

1. A device for determining the laminar to turbulent boundary layer transition on a surface the combination comprising:
    a wing surface having orifices positioned along its surface and subjected to an airflow;
    noise detecting means for producing audio frequency electrical signals proportional to the noise levels at said orifices along said wing surface caused by said airflow;
    pressure detecting means for producing electrical signals proportional to the pressures at said orifices upon the wing surface; and
    acquisition means for automatically collecting and storing the signals produced by said noise detecting means and said pressure detecting means.

2. A device as in claim 1 wherein said noise detecting means comprises an accelerometer connected to said orifice and an audio amplifier connected to the output of the accelerometer.

3. A device as in claim 2 wherein said pressure detecting means comprises a pressure transducer connected to said orifices.

4. A device as in claim 3 including:
    pneumatic tubes extending from said orifices connecting said orifices to said accelerometer and said pressure transducer.

5. A device as in claim 4 including:
    a scanning valve means for selectively connecting said orifices to said accelerometer and said pressure transducer.

6. A device as in claim 5 wherein said acquisition means comprises
    a speaker connected to said amplifier for producing an audio output; and
    a recording means for recording the signals produced by said accelerometer, pressure transducer and amplifier.

7. A method of detecting laminar to turbulent boundary layer transition on a surface subjected to an airflow comprising the steps of:
    providing orifices at various points along said surface;
    pneumatically connecting said orifices to a location remote to the environment of said surface;
    producing audio frequency electrical signals at said remote location that are proportional to the noise levels at said orifices; and
    recording said audio frequency electrical signals.

* * * * *